US011935394B1

United States Patent
Meenehan

(10) Patent No.: US 11,935,394 B1
(45) Date of Patent: Mar. 19, 2024

(54) CONTEXT AWARE DOORBELL SYSTEM

(71) Applicant: Arlo Technologies, Inc., Carlsbad, CA (US)

(72) Inventor: Kyle Meenehan, Midleton (IE)

(73) Assignee: Arlo Technologies, Inc., Carlsbad, CA (US)

( * ) Notice: Subject to any disclaimer, the term of this patent is extended or adjusted under 35 U.S.C. 154(b) by 0 days.

(21) Appl. No.: 17/957,815

(22) Filed: Sep. 30, 2022

(51) Int. Cl.
*G08B 5/22* (2006.01)
*G08B 7/06* (2006.01)
*G08B 27/00* (2006.01)

(52) U.S. Cl.
CPC .............. *G08B 5/225* (2013.01); *G08B 7/06* (2013.01); *G08B 27/006* (2013.01)

(58) Field of Classification Search
CPC ......... G08B 5/225; G08B 7/06; G08B 27/006
See application file for complete search history.

(56) References Cited

U.S. PATENT DOCUMENTS

| | | | |
|---|---|---|---|
| 8,780,201 B1 * | 7/2014 | Scalisi | H04N 7/186 348/143 |
| 8,872,915 B1 * | 10/2014 | Scalisi | H04M 11/025 348/140 |
| 9,772,612 B2 | 9/2017 | Mccarthy, III et al. | |
| 9,960,929 B2 | 5/2018 | Fadell et al. | |
| 11,315,394 B1 * | 4/2022 | Jackson | G08B 13/18 |
| 2021/0194718 A1 | 6/2021 | Scalisi | |

\* cited by examiner

*Primary Examiner* — Brian Wilson
(74) *Attorney, Agent, or Firm* — Boyle Fredrickson S.C.

(57) ABSTRACT

A doorbell system includes a doorbell located within a wireless local area network (WLAN) and communicatively connected to a wireless wide area network (WAN), a number of user devices communicatively connected to the WAN, and a controller. The doorbell includes an activation element and a monitoring element. The controller is configured to receive an indication of a user engaging the activation element of the doorbell and to select at least one of the user devices for display of an alert based on a priority status of the user devices. The system may alter or update the priority status of the user devices based on a user-dependent parameter of the priority devices, such as the users' schedules, sleep status, geo-location, or status as a caregiver.

17 Claims, 2 Drawing Sheets

CONTEXT AWARE DOORBELL SYSTEM

BACKGROUND OF THE INVENTION

1. Field of the Invention

The present invention relates to an electronic doorbell system communicative with user devices. More specifically, the doorbell system is configured to prioritize alerts and audio/video data sent to user devices.

2. Discussion of the Related Art

A doorbell is a signaling device typically placed near a door to a building's entrance. When a visitor presses a button, the bell rings or otherwise generates a human discernable signal inside the building, alerting the occupant to the presence of the visitor. Although the first doorbells were mechanical, activated by pulling a cord, modern doorbells are generally electric switches; and the most recent versions may contain miniature cameras, may be connected to the Internet, and may even incorporate facial recognition technology. These doorbells permit a user to monitor doorbell activation remotely via an application on user-accessible device such as a computer or smartphone.

However, modern doorbells continue to suffer from several drawbacks. For example, although such doorbells can initiate contact with a remote user, the remote user might be busy and unable to actually speak to the visitor at the particular time of contact. In addition, the presence of someone at the door might be of more interest to one member of a household than another. As an example, the head of the household may want to interact directly with a scheduled technician or repair person and, as such, may want the notification to be sent only to him or her. As still another example, an occupant of a household may not want to receive a doorbell activation notice if he or she is sleeping or otherwise occupied.

As such, there is a need in the art for a doorbell system that can prioritize which users are notified of doorbell activation based on priority and availability of the different users associated with the doorbell system.

SUMMARY OF THE INVENTION

According to one aspect of the, a doorbell system includes a doorbell that is located within a wireless local area network (WLAN) and that is communicatively connected to a wireless wide area network (WAN), a plurality of user devices communicatively connected to the WAN, and a controller. The doorbell includes an activation element and a monitoring element. Further, the controller is configured to receive an indication of a user engaging the activation element of the doorbell and, based on a priority status of the plurality of user devices, cause an alert to be displayed on at least one user device of the plurality of user devices based on the priority status.

In accordance with another aspect of the invention, the controller may be configured to update the priority status of the user device based on at least one user-dependent parameter to select a user device for the display of the alert based on the updated priority status. Examples of the at least one parameter include a schedule associated with one or more of the user devices, a sleep setting for one or more the user devices, a geo-location of one or more of the user devices, and/or a care setting of the doorbell system.

In accordance with yet another aspect of the invention, the monitoring element may be configured to generate monitoring data in the form of audio and/or video data. In turn, the controller communicates the monitoring data to at least one user device of the plurality of user devices based on the priority status.

Other aspects of the invention include methods of operating such a doorbell system and methods of prioritizing alerts and monitoring data generated by such a doorbell system.

These and other objects, advantages and aspects of the invention will become apparent from the following description. The particular objects and advantages described herein can apply to only some embodiments falling within the claims and thus do not define the scope of the invention. In the description, reference is made to the accompanying drawings which form a part hereof, and in which there is shown a preferred embodiment of the invention. Such embodiment does not necessarily represent the full scope of the invention and reference is made, therefore, to the claims herein for interpreting the scope of the invention.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION

Figure 1:
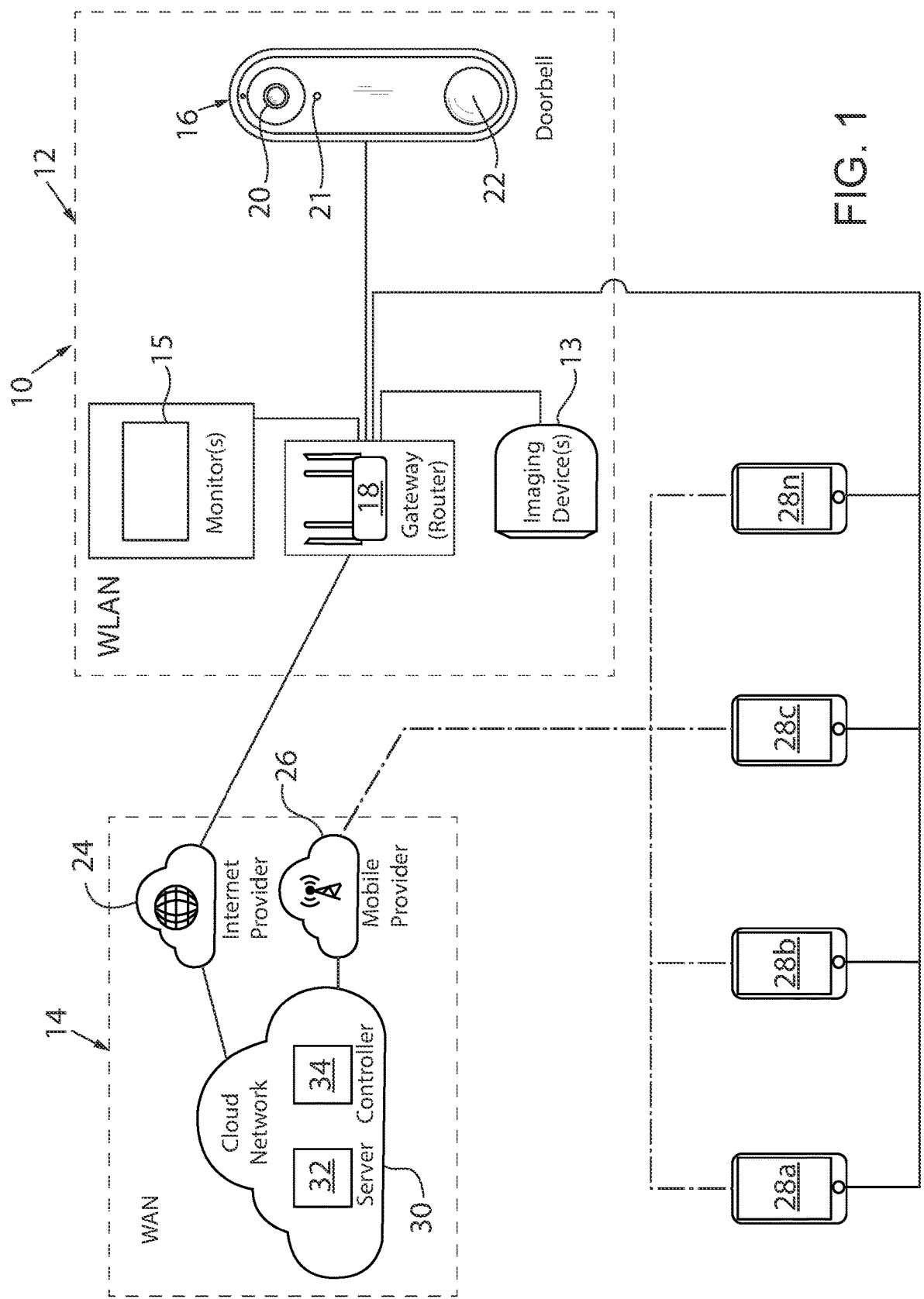
FIG. 1 is a schematic representation of a system for prioritizing alerts associated with activation of a doorbell.

Referring now to FIG. 1, in accordance with an aspect of the invention, an electronic doorbell system 10 is provided that is implemented in a WLAN (wireless local area network) operating environment 12. The WLAN 12 is communicatively connected to a WAN (wide area network) operating environment 14. Various electronic devices 13, 15, 16, sometimes referred to as "client devices," operate within WLAN 12. The client devices are wirelessly networked to a gateway router 18 in order to communicate with the WAN 14 and the Internet. The gateway router 18 may be connected to or contain a base station hub (not shown) serving as an interface between the various components of the WAN and possibly perform data processing and storage functions. The client devices may comprise any of a number of devices, including video cameras or other imaging devices 13, monitors 15 such as smoke detectors or floodlight detectors, and one or more doorbells 16. The illustrated doorbell 16 is installed at an occupied premises (e.g., home, office, store, etc.) at or adjacent an entrance to such a premises.

Still referring to FIG. 1, the doorbell 16 of the representative embodiment includes a monitoring element 20 configured to capture video and/or audio of a monitored area at or near the entrance of the building and an activation element 22 to activate the monitoring element 20 of the doorbell 16. That is, someone may activate the doorbell 16 may engaging the activation element 22. In some embodiments of the invention, the activation element 22 is in the form of a pressable button. In varying embodiments of the invention, the monitoring element 20 may include a still or video camera, a microphone, or both. The doorbell 16 also may have a speaker 21 that permits two-way communication with the person operating the doorbell.

The router 18 is typically implemented as a WIFI hub that communicatively connects the WLAN 12 to the WAN 14 through an Internet Provider 24. Internet provider 24 includes hardware or system components, or features such last-mile connection(s), cloud interconnections, DSL (digital subscriber line), cable, and/or fiber-optics. As shown in FIG. 1, the WAN 14 may also be accessed through a data provider or mobile provider 26. The mobile provider 26 includes hardware or system components or features to implement various cellular communications protocols such as 3G, 4G, LTE (long term evolution), 5G, or other cellular standard(s). Each of the Internet provider 24 and the mobile provider 26 allows the components of system 10 to interact with a backend system or control services that can control functions or provide various processing tasks of components of system 10, shown as a cloud-based backend control service system 30, which could be an Arlo® SmartCloud system. The backend system includes at least one server 32 that provides, for example, cloud storage of events. Server 32, or another appropriate system device, may also be in communication with or include a computer vision program ("CV"), which can apply one or more filters or processes, such as edge detection, facial recognition, motion detection, etc., to one or more detected characteristics of the recording such as, but not limited to, identifying an individual, animal, vehicle, or package present in a recording.

While FIG. 1 illustrates the controller 34 within the cloud network 30, varying embodiments of the invention may include interconnected aspects of the controller 34 and the programs executed by it as being distributed in various components of the system 10. The controller 34 can include or be coupled to a microprocessor, a microcontroller or other programmable logic element (individually and collectively considered "a controller") configured to execute a program. The controller 34 also may be contained in whole or at least in part in the doorbell 16, the gateway router 18, the base station hub (if separate from the router 18), and the server 32. The controller 34 may perform processes such as filtering, processing, categorizing, storing, recalling and transmitting data received from the client devices 13, 15, and 16 and of providing display instructions and prompts to the user devices 28.

For example, the doorbell 16 can include a component or group of components that are configured to execute, implement, and/or perform any of the processes or functions described herein for the controller 34 or a form of instructions to carry out such processes or cause such processes to be performed. Part or all of the circuitry of the controller 34 also could be located in gateway router 18 and/or the base station hub (if present).

Still referring to FIG. 1, one or more user devices 28, such as a smart phone, laptop, PC, tablet, or other smart device may communicate with various components or devices within each of the WLAN 12 and WAN 14 to provide an interface through which a user may interact with system 10. Each user device 28 includes a display 29 with one or both of an audio interface such as a speaker and a microphone and a video display such as a touchscreen. Each user device 28 also has internal computing and storage capabilities and a program or application services as the user interface with the remainder of the system 10. In the representative embodiment of the invention, four user devices 28a, 28b, 28c, . . . 28n are shown associated with the system 10. Users may add or remove any number of user devices 28 to the system 10. It is contemplated that a primary user or users having administrative privileges may have access to add or remove any number of user devices 28, client devices 13, 15, 16, or such to the system 10, while other users not having administrative privileges are unable to modify the system 10. The initial priority setting function also may be limited to user(s) having administrative privileges.

The system 10 is configured to implement a seamless communication environment between the doorbell 16, the server 32, the controller 34, and the user devices 28 in order to provide monitoring data from the monitoring element 20 of the doorbell 16 to one or more of the user devices 28. The doorbell 16 also provides an alert upon activation of the activation element 22 of the doorbell 16. The monitoring data may be in the form of audio data and/or video data. The controller 34 is configured to determine which user device(s) 28 receive(s) the alert associated activation of the activation element 22 of the doorbell and to determine what information to be displayed by the determined user device(s) 28 based on a number of parameters, which may include information provided by the server 32 of the cloud network 30. When the user devices 28 are located outside of the WLAN 12, the user devices 28 are able to connect to the cloud network 30 via the mobile provider 26. When the user devices 28 are located within the WLAN 12 and connected thereto, the user devices 28 are able to connect to the cloud network 30 via the Internet provider 24 via the router 18 and/or via the mobile provider 26.

As stated above, the controller 34 is configured to determine which user device(s) 28 to send the alert and monitoring data based on a number of parameters and prioritization of the user devices 28. For instance, the controller 34 contains or has access to information regarding user devices 28 registered to a user and associated with the doorbell 16. For example, the information may be stored in the server 32, in which case the server 32 is able to provide information to the controller 34 regarding which user devices 28 are associated with a specific doorbell 16.

As previously discussed, each user device 28 includes a program or application that serves as the user interface. Via the user interface, a user having administrative privileges can set parameters that prioritize which user devices 28 should be notified when the associated doorbell 16 is activated. For instance, the user can identify user device 28a as having first priority, user device 28b as having second priority, and user device 28c as having third priority. As a result, when the doorbell 16 is activated, the controller selects the user device 28a with the highest priority to display the alert 34 and the monitoring data. Additional parameters described in further detail below can be used by the controller 34 to update the priority status such that the controller 34 causes the alert and monitoring data to be displayed on another device 28b or 28c with a lower priority.

One such additional parameter to be considered by the controller when updating the priority status can be the schedule of the users associated with each user device 28. For instance, the controller 34 can contain or have access to a calendar or schedule for the users of each user device 28. The controller 34 is configured to determine a user's availability based on the calendar or schedule. For example, if the calendar or schedule for the user associated with the user device 28a having first priority indicates that the user is unavailable the controller 34 is configured to update the priority status and select the user device 28b having second priority for the display of the alert and monitoring data instead of the user device 28a having first priority. Similarly, if the calendar or schedule for the users associated with the user devices 28a, 28b having first and second priority indicate that the users are unavailable or indisposed, the controller 34 is configured to update the priority status and select the user device 28c having third priority for the display of the alert and the monitoring data. In an instance where the calendar or schedule indicates that all users are unavailable, the controller 34 may be configured to override the calendar and to select the user device 28a having the first priority for the display of the alert and have the monitoring data.

It should be understood that the term "update" as used herein when setting or determining priority status should be interpreted broadly in that the parameters could be taken into account during initial priority status setting using a drop-down menu or the like. The priority status settings also could change dynamically, such as would occur if a user device 28 moves away from the premises of the doorbell. This "updating" thus could also be considered "altering" or "customizing."

Another parameter that can be used to update the priority status can be a sleep setting in which a user can interface with his or her user device 28, or another device entirely such as a voice assistant such as Alexa®, to indicate that they do not want to be disturbed. In varying embodiments of the invention, the sleep setting can be for a specific amount of time or for an open-ended amount of time and require that it be deactivated by the user. In this implementation, the controller 34 is configured to determine, either by itself or using information received from the server 32, whether the sleep setting for a particular user device 28a, 28b, 28c, etc. is in effect. For example, if the sleep setting has been activated for the user device 28a having first priority, the controller 34 is configured to update the priority status and select the user device 28b having second priority for the display of the alert and the monitoring data. Similarly, if the sleep setting has been activated for the user devices 28a, 28b having first and second priorities, the controller 34 is configured to select the user device 28c having third priority for display of the alert and monitoring data. In a situation in which the sleep settings have been activated for all user devices, the controller 34 may be configured to override the sleep settings to select the user device 28a having first priority for the display of the alert and monitoring data.

Yet another parameter that may be relied upon to update the priority status of the user devices may include the geo-location of the user device 28. As previously stated, each user device 28 includes a program or application that serves as the user interface and is connected to the server 32 via the mobile provider 36. Via the program or application, the user device 28 is able to communicate its geo-location to the server 32 by way of the mobile network 26. The controller 34 can then access this information from the server 32 (unless the controller 34 is contained in the server 32, in which case the controller 34 and server 32 can be considered one and the same). Based on the geo-location of each user device 28, the controller 34 is able to determine which user device 28 is located at the building or other premises associated with the doorbell 16. The controller 34 then updates the priority status and eliminates user devices from the priority list that are not at the premises associated with the doorbell. Hence, if user device 28a has the highest priority but the controller determines that the user device 28a is off-site, the controller 34 selects the user device 28b having the next highest priority for display of the alert and monitoring data.

Another additional parameter that may be relied upon to update the priority status may include a third-party care setting of the system 10. For instance, if a third-party is monitoring a premises while the premises occupant is unavailable, the premises occupant may use the user interface to establish the user device 28 of the third-party and put the system in a "care setting", which would temporarily place the user device 28 of the third party as the primary or highest-priority user device. It is contemplated that such change to the system 10 would require the premises occupant to have the administrative privileges discussed above. When the system 10 is in the care setting, the controller 34 is configured to send the alert and monitoring data to the user device 28 of the designated third-party to receive the alerts and monitoring data. In another non-limiting example, the system 10 could be placed in the care setting to designate the user device 28 of a babysitter as the primary user device 28 for a period of time. In this instance, the controller 34 would be configured to case the alerts and monitoring data to be displayed by the user device 28 of the third-party babysitter.

Figure 2:
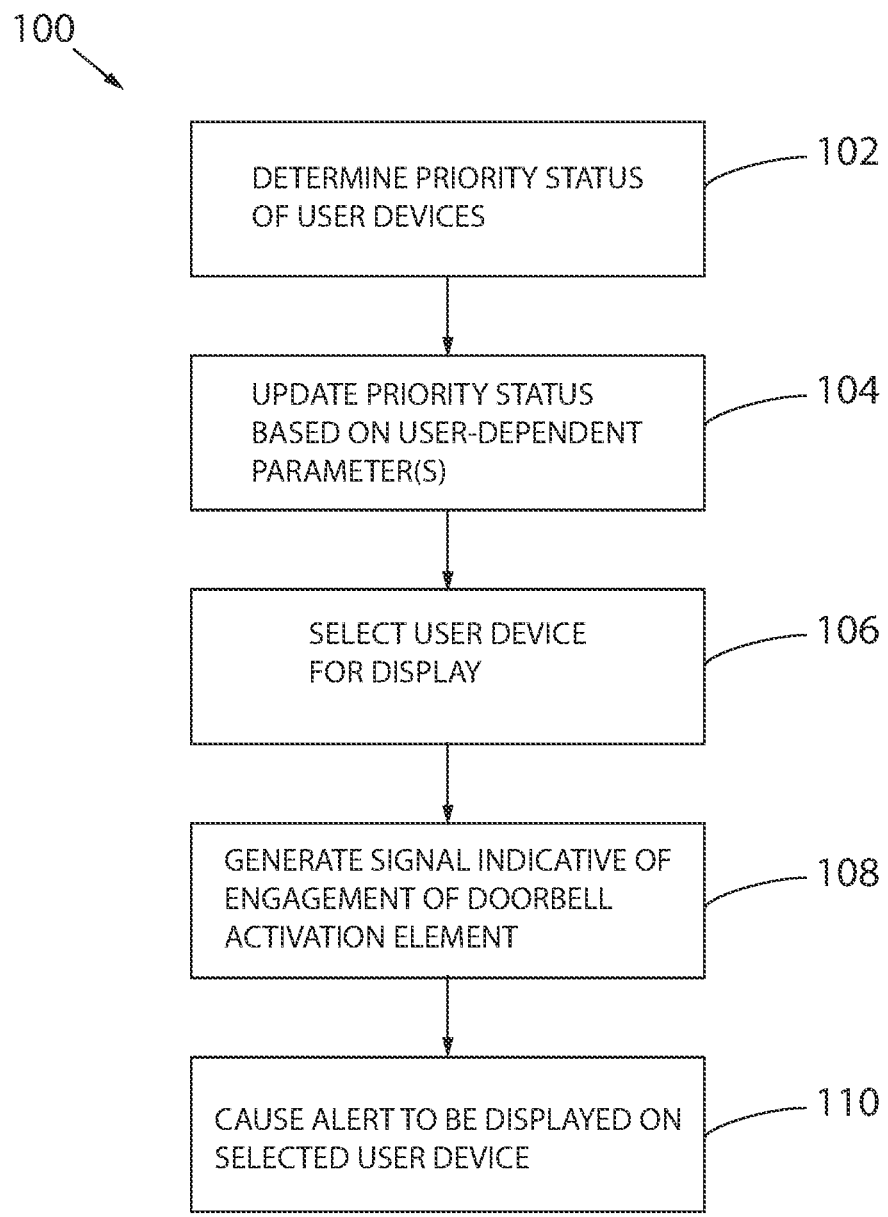
FIG. 2 is a flowchart of a method of operation of the system represented in FIG. 1.

Referring now to FIG. 2, a process 100 for prioritizing which user device 28 displays the alert and monitoring data generated by the monitoring element 20 of the doorbell 16 is shown. This process 100 may be performed in whole or in part in the controller 34, interacting with the server 32, the user devices 28a-28n, and the doorbell 16. The process begins at block 102 where the priority status of the activation of the user devices 28a-28n is determined. This determination may be simply set by a user using an app on one of the user devices. For example, the app may prompt the user to enter/identify the user devices 28a-28n and to prioritize amongst them. The selected/determined priority is then transmitted from the user device 28 to the controller 34 and/or the server 32. The determined priority status is then transmitted as necessary and stored in the user devices 28a-28n, the controller 34, and/or the server 32. As discussed above, this operation may be limited to a user having admin privileges.

Next, in block 104, the determined priority status may be updated based on one or more user dependent parameters, such as one or more of those described above. For example, as a result of entering schedules and sleep status information, the priority ranking of the user devices may change from 28a, 28b, 28c to 28c, 28b, 28a, respectively. If geo-location processing thereafter determines that user device 28c has moved off premises, user device 28c may be taken off the priority list entirely, and the new (updated) priority list will be 28b, 28a. If the updating results in all of the user devices being removed from the priority list, the process 100 reinstitutes the initially set highest priority user device 28a as the only (and thus first or highest) priority device. The process 100 then selects the reordered highest device for displaying an alert in block 106.

In block 108, the process 100 reacts to engagement of the doorbell activation element by generating a signal indicative of such activation. The signal will be an electronic signal that is transmitted to the WAN from the WLAN via the gateway router 18. It may also include or be accompanied by video data and/or audio data. Engagement of the activation element also could activate a chime or other audio and/or visual notification located at the doorbell 16 and/or within the building.

Finally, in block 110, the process 100 causes an alert to be displayed on the selected user device. The alert may take the form of, for example, an audio alert such as a chime, beep or automated "doorbell activation" voice notification, and/or a visual alert such as a push notification displaying a text message or a still image or short video (GIF) of the person activating the doorbell. The nature of the alert could be determined by an app on the user device 28, the controller 34, or some combination of thereof.

In the above examples, the user devices are prioritized such that only a single user device displays any given alert/monitoring data. That need not be the case. The user devices could be grouped. For example, a single user device such as 28*a* may be given unique priority such as "head of household", while two or more other user devices such as 28*b* and 28*c* could be given equal priority such as "children". In this scenario, if the user device 28*a* having highest priority is not selected for any of the reasons discussed above, the controller 34 could be configured to select both of the user devices 28*b* and 28*b* having the second highest priority for the display of the alert and monitoring data.

In addition, in the examples above, the same alert and monitoring data is displayed on the selected user device regardless of the priority status of that user device. That need not be the case. For example, it is conceivable that live streaming of video data may be available for the highest priority user device, whereas only a still image or only the alert is available for other user devices.

Hence, it will be appreciated that, although the best mode contemplated by the inventor of carrying out the present invention is disclosed above, practice of the above invention is not limited thereto. It will be manifest that various additions, modifications and rearrangements of the features of the present invention may be made without deviating from the spirit and the scope of the underlying inventive concept.

It should be appreciated that such a development effort might be complex and time consuming, but would nevertheless be a routine undertaking of design, fabrication, and manufacture for those of ordinary skill having the benefit of this disclosure. Nothing in this application is considered critical or essential to the present invention unless explicitly indicated as being "critical" or "essential."

What is claimed is:

1. A doorbell system comprising:
a doorbell having an activation element and a monitoring element, the doorbell being located within a wireless local area network (WLAN) and communicatively connected to a wireless wide area network (WAN); and
a controller configured to:
receive an indication of a user engaging the activation element of the doorbell;
set an initial priority status of a plurality of user devices, the initial priority status including at least a primary initial status and a secondary initial status that is lower than the primary initial status;
automatically update the priority status of at least one of the plurality of user devices to an updated priority status based on at least one user-dependent parameter, the updated priority status being a different than the initial priority status and being a primary priority status;
cause an alert to be displayed by at least one user device of the plurality of user devices based on the updated primary priority status.

2. The doorbell system of claim 1, wherein the at least one user-dependent parameter includes a schedule associated with one or more of the plurality of user devices.

3. The doorbell system of claim 1, wherein the at least one user-dependent parameter includes a sleep setting for one or more of the plurality of user devices.

4. The doorbell system of claim 1, wherein the at least one user-dependent parameter includes a geo-location of one or more of the plurality of user devices.

5. The doorbell system of claim 1, wherein the at least one user-dependent parameter includes a temporary third-party care setting of the doorbell system via which the doorbell system temporarily includes a third-party user device in the plurality of user devices; and
wherein the controller designates the third-party user device as having primary updated priority status and causes the alert to be displayed on the third-party user device based on the designation of the third-party user device having primary updated priority status.

6. The doorbell system of claim 1, wherein the controller is located within a cloud network of the WAN.

7. The doorbell system of claim 1, wherein the monitoring element generates a monitoring data; and
wherein the controller communicates the monitoring data to at least one user device of the plurality of user devices based on the priority status.

8. A method of operating a doorbell system, the method comprising:
communicating an engagement of the activation element of a doorbell;
selecting at least one user device of a plurality of user devices to display an alert based on a priority status of each of the plurality of user devices, the priority status including a primary priority status and a secondary priority status that is lower than the primary priority status; and
determining at least one user-dependent parameter associated with each user device, wherein the least one user-dependent parameter includes a third-party care setting of the doorbell system configured to temporarily include a third-party user device in the plurality of user devices;
updating the priority status of the plurality of user devices using the third-party care setting to temporarily designate the third-party user device as having updated primary priority status; and
providing the alert and audio and/or video data to at least the third-party user device based on the updated primary priority status.

9. The method of claim 8, further comprising:
generating the audio and/or video data; and
providing the audio and/or video data to the at least one selected user device.

10. The method of claim 8, wherein the at least one user-dependent parameter includes a schedule associated with one or more of the plurality of user devices.

11. The method of claim 8, wherein the at least one user-dependent parameter includes a sleep setting for one or more of the plurality of user devices.

12. The method of claim 8, wherein the at least one user-dependent parameter includes a geo-location of one or more of the plurality of user devices.

13. A method of prioritizing an alert and a monitoring data generated by a doorbell system, the method comprising:
generating the alert based on activation of a doorbell of the doorbell system;
generating the monitoring data upon activation of the doorbell of the doorbell system;
setting an initial priority status of each of a the plurality of user devices, the initial priority status including at least a primary initial priority status and a secondary initial priority status that is lower than the primary initial priority status;
automatically updating the priority status of the plurality of user devices to an updated priority status using at least one user-dependent parameter, the updating including changing the priority status of at least one the plurality of user devices from a secondary priority status to an updated primary priority status; and then
providing the alert and the monitoring data to at least one of the plurality of user devices having the updated primary priority status.

14. The method of claim 13, wherein the at least one user-dependent parameter includes a schedule associated with one or more of the plurality of user devices.

15. The method of claim 13, wherein the at least one user-dependent parameter includes a sleep setting for one or more of the plurality of user devices.

16. The method of claim 13, wherein the at least one user-dependent parameter includes a geo-location of one or more of the plurality of user devices.

17. The method of claim 13, wherein the at least one user-dependent parameter includes a third-party care setting of the doorbell system;
wherein updating the priority status of the plurality of user devices using the third-party care setting temporarily designates a third-part user device as having the primary updated status, and wherein providing comprises providing the alert and the monitoring data to the third-party user device.

\* \* \* \* \*